(12) United States Patent
Nitoh et al.

(10) Patent No.: US 7,398,593 B2
(45) Date of Patent: Jul. 15, 2008

(54) APPARATUS FOR PRODUCING CAPACITOR ELEMENT MEMBER

(75) Inventors: Hiroshi Nitoh, Nagano (JP); Toshihiro Okabe, Nagano (JP); Kenji Ishii, Nagano (JP); Atsushi Sakai, Nagano (JP)

(73) Assignee: Showa Denko K.K., Tokyo (JP)

( * ) Notice: Subject to any disclaimer, the term of this patent is extended or adjusted under 35 U.S.C. 154(b) by 396 days.

(21) Appl. No.: 10/363,307

(22) PCT Filed: Aug. 31, 2001

(86) PCT No.: PCT/JP01/07542

§ 371 (c)(1),
(2), (4) Date: Mar. 3, 2003

(87) PCT Pub. No.: WO02/19354

PCT Pub. Date: Mar. 7, 2002

(65) Prior Publication Data

US 2003/0156376 A1 Aug. 21, 2003

Related U.S. Application Data

(60) Provisional application No. 60/263,752, filed on Jan. 25, 2001, provisional application No. 60/263,754, filed on Jan. 25, 2001, provisional application No. 60/263,755, filed on Jan. 25, 2001.

(30) Foreign Application Priority Data

| Sep. 1, 2000 | (JP) | ............................. 2000-264878 |
| Oct. 24, 2000 | (JP) | ............................. 2000-324088 |
| Oct. 24, 2000 | (JP) | ............................. 2000-324089 |

(51) Int. Cl.
*B23P 19/00* (2006.01)
*B23P 23/00* (2006.01)

(52) U.S. Cl. ............................. 29/742; 29/729; 29/741; 29/749; 156/64

(58) Field of Classification Search ............... 29/603.12, 29/603.16, 603.2, 827; 360/135, 251.2, 256.2; 428/141; 156/64, 253, 281, 323, 361, 389; 361/301.3
See application file for complete search history.

(56) References Cited

U.S. PATENT DOCUMENTS 2,997,294 A 8/1961 Gitzendanner (Continued)

FOREIGN PATENT DOCUMENTS

GB 900 682 A 7/1962

(Continued)

*Primary Examiner*—A. Dexter Tugbang
*Assistant Examiner*—Tai van Nguyen
(74) *Attorney, Agent, or Firm*—Sughrue Mion, PLLC

(57) ABSTRACT

The present invention relates to an apparatus for producing a comb-like capacitor element member including a guide member and a plurality of rectangular metal foil pieces bonded to the guide member, comprising an automatic feed mechanism for feeding tape-like foil by a constant lenght toward the guide member, a bonding mechanism for bonding the metal foil to the guide member, and a cutting mechanism for cutting the bonded metal foil. According to the apparatus of the present invention, a comb-like capacitor element member having a plurality of rectangular metal foil pieces bonded can be produced efficiently, by bonding the elongated tape-like metal foil without damaging it.

9 Claims, 12 Drawing Sheets

U.S. PATENT DOCUMENTS

| | | | | |
|---|---|---|---|---|
| 3,416,215 A | * | 12/1968 | Allen | 29/2 |
| 3,887,419 A | * | 6/1975 | Geschwender | 156/197 |
| 3,975,608 A | * | 8/1976 | Ullmann et al. | 219/69.17 |
| 4,579,612 A | * | 4/1986 | Held | 156/64 |
| 5,169,481 A | * | 12/1992 | Braunshteyn et al. | 156/378 |
| 5,295,296 A | * | 3/1994 | Hagiwara et al. | 29/827 |
| 5,772,838 A | * | 6/1998 | Zablotny et al. | 156/512 |

FOREIGN PATENT DOCUMENTS

| | | |
|---|---|---|
| GB | 1 056 521 A | 1/1967 |
| JP | 2-305430 A | 12/1990 |
| JP | 4-17318 | 1/1992 |
| JP | 4-236415 A | 8/1992 |
| JP | 5-166681 | 7/1993 |
| JP | 5-299309 | 11/1993 |
| JP | 9-36003 | 2/1997 |
| JP | 9-070792 A | 3/1997 |
| JP | 9-260218 | 10/1997 |
| WO | WO 97/06660 A | 2/1997 |

* cited by examiner

APPARATUS FOR PRODUCING CAPACITOR ELEMENT MEMBER

CROSS-REFERENCE TO RELATED APPLICATION

This application is an application filed under 35 U.S.C. §111(a) claiming benefit pursuant to 35 U.S.C. §119(e)(1) of the filing date of Provisional Applications 60/263,752, 60/263,754 and 60/263,755 filed on Jan. 25, 2001 pursuant to 35 U.S.C. §111(b).

TECHNICAL FIELD

The present invention relates to an apparatus for producing a capacitor element member to be used in production of monolayer capacitor elements. More particularly the present invention relates to an apparatus for producing a comb-like capacitor element member configured through bonding of rectangular metal foil pieces having a constant length and serving as valve metal to a metallic guide (guide member), an apparatus for feeding metal foil automatically and an apparatus for cutting metal foil used in the apparatus for producing the capacitor, and to a metal foil produced by the cutting apparatus.

BACKGROUND ART

With recent tendencies toward electronic apparatus becoming not only of higher performance but also compact and portable, electronic components used therein are becoming more compact and of higher performance. Particularly, a capacitor for use in an output smoothing circuit section of a power supply is required to assume low impedance and low equivalent series resistance (ESR) in a high frequency band.

A solid electrolytic capacitor, which uses a conducting polymer as electrolyte, can be made into a compact large-capacitance capacitor of low impedance and low ESR through stacking of monolayer capacitor elements. Various solid electrolytic capacitors of this type have been proposed.

A conventionally proposed method for producing monolayer capacitor elements for use in a solid electrolytic capacitor includes the steps of forming, through blanking, a comb-like blank from wide metal foil, the comb-like blank including a support portion and a plurality of protrusions, which will be used as capacitor elements; processing the protrusions after the support portion is fixed on, for example, a rest plate; cutting the processed protrusions from the support portion; and stacking the cut pieces (Japanese Patent Application Laid-Open (kokai) No. 5-166681). Another proposed method includes the steps of forming metal foil into a blank assuming a predetermined shape through, for example, photoetching; obtaining monolayer capacitor element from the blank; and stacking the monolayer capacitor element (Japanese Patent Application Laid-Open (kokai) No. 9-36003). However, these methods have the problems of insufficient economy and low production efficiency.

In order to solve the problems of the conventional production methods, the present inventors, among others, have proposed a method which repeats the steps of connecting elongated tape-like metal foil to a side edge of a metal plate or metal wire (guide member) perpendicularly to the length direction of the guide member and cutting the metal foil to a predetermined length, to thereby form a comb-like member including the guide member and a plurality of metal foil pieces bonded, in parallel to one another, to the guide member and which further includes the steps of forming sequentially on the surface of each of the metal foil pieces a dielectric oxide film layer, a semiconductor layer, and a conductor layer and separating the metal foil pieces from the guide member for use as solid electrolytic capacitor elements (Japanese Patent Application Laid-Open (kokai) No. 4-17318 (Japanese Patent No. 2828317)). This method can produce a solid electrolytic capacitor element efficiently at low cost.

The present invention relates to a production apparatus for carrying out, at good productivity, the previously proposed production method mentioned above and provides an apparatus for producing, at good productivity, a comb-like capacitor element member including a metallic guide (guide member) and rectangular metal foil pieces, each serving as valve metal, bonded to the guide member. In production, mere shearing of metal foil tends to cause generation of burrs or cracks on the cut surface of a resultant metal foil piece, thus damaging the metal foil piece. Such damage to the foil impairs characteristics of a monolayer capacitor element, thus impairing efficiency in production of a solid electrolyte capacitor, particularly a solid electrolyte multilayer capacitor. Thus, a production apparatus of the present invention employs a preferred cutting mechanism in which, after cutting, cutting blades retreat from the cutting position while maintaining a clearance therebetween, to thereby suppress generation of burrs and cracks. When an electrode of a welding machine becomes dirty during welding of metal foil, continuous welding becomes difficult to attain; therefore, the production apparatus of the present invention employs an automatic polishing mechanism for polishing the electrode to thereby enable continuous and accurate bonding of metal foil.

The present invention further provides an automatic feed apparatus equipped with a constant-length feed mechanism for automatically feeding an elongated tape-like metal foil by a constant length for carrying out, at good productivity, the previously proposed production method mentioned above. Since the elongated tape-like metal foil is thin, the foil is easily torn or broken, and the foil surface is damaged easily. Therefore, the present invention also provides an automatic metal-foil feed apparatus, which is preferably equipped with means for preventing breakage of the foil and damage to the foil surface and which can draw the elongated tape-like metal foil from a reel and feed the metal foil by a constant length every feeding operation, with high positional accuracy and without damaging or deforming the metal foil, in a process for bonding a plurality of pieces of the metal foil to a metallic guide.

Further, the present invention provides an apparatus and a method for cutting an elongated tape-like metal foil which is used in an apparatus for producing a capacitor element member. Conventionally, a capacitor element sheet is cut by use of a cutter or dicing saw (Japanese Patent Application Laid-Open (kokai) No. 09-260218) or by use of a laser beam (Japanese Patent Application Laid-Open (kokai) No. 05-299309) in order to produce capacitor elements. However, cutting by use of a cutter or dicing saw causes deformation of cut surfaces, such as sagging and cracks, and imparts great damage to the cut surfaces, such as exfoliation of an etching layer of a metal foil (dielectric body layer). Such damage to foil causes a deterioration in the properties of monolayer capacitor elements, and production efficiency of solid electrolyte multilayer capacitors decreases. When cutting is performed by use of a laser, the damage to cut surfaces is relatively small. However, production cost becomes high due to high facility cost, and the size of the facility increases.

The present invention provides a cutting apparatus and method which do not impart such damage to metal foil and hardly produce burrs, cracks, or deformation on cut surfaces.

DISCLOSURE OF INVENTION

The present invention relates to an apparatus for producing a capacitor element member, configured in the following manner, an apparatus for feeding metal foil automatically and an apparatus for cutting metal foil used in the apparatus for producing a capacitor, a method for cutting metal foil and a metal foil produced by the method.

1. An apparatus for producing a capacitor element member to be used in production of monolayer capacitor elements, characterized by comprising an automatic feed mechanism for feeding metal foil by a constant length toward a guide member, a mechanism for bonding the metal foil to the guide member, and a mechanism for cutting the bonded metal foil.
2. The apparatus for producing a capacitor element member as described in 1, wherein the automatic feed mechanism comprises a constant-length feed mechanism for feeding the metal foil by a constant length, a slack mechanism for adjusting slack in the metal foil drawn from a reel, and a positioning mechanism for adjusting a feed position of the metal foil.
3. The apparatus for producing a capacitor element member as described in 1, wherein the automatic feed mechanism comprises a constant-length feed mechanism for feeding the metal foil by a constant length, a slack mechanism for adjusting slack in the metal foil drawn from a reel, a positioning mechanism for adjusting a feed position of the metal foil, and a mechanism for removing dust from a surface of the metal foil.
4. The apparatus for producing a capacitor element member as described in any one of 1 to 3, wherein the bonding mechanism comprises welding means.
5. The apparatus for producing a capacitor element member as described in 4, wherein the welding means of the bonding mechanism is a spot-welding mechanism.
6. The apparatus for producing a capacitor element member as described in 4, wherein the bonding mechanism is a continuous spot-welding mechanism and further comprises a polishing mechanism for polishing an electrode.
7. The apparatus for producing a capacitor element member as described in any one of 1 to 6, wherein the cutting mechanism is a shear-cutting mechanism for shearing the metal foil by a scissorlike action.
8. The apparatus for producing a capacitor element member as described in any one of 1 to 6, wherein the cutting mechanism shears the metal foil by a scissorlike action and comprises a mechanism for, after cutting, retreating cutting blades while maintaining a clearance therebetween.
9. The apparatus for producing a capacitor element member as described in any one of 1 to 8, wherein the automatic feed mechanism, the cutting mechanism, and the bonding mechanism are sequentially disposed along a direction of feed of the metal foil.
10. The apparatus for producing a capacitor element member as described in any one of 1 to 8, wherein the automatic feed mechanism, the bonding mechanism, and the cutting mechanism are sequentially disposed along a direction of feed of the metal foil.
11. The apparatus for producing a capacitor element member as described in any one of 1 to 10, wherein the apparatus repeats a series of steps of feeding the metal foil by a constant length by means of the automatic feed mechanism until an end of the metal foil reaches the guide member, welding under pressure the end of the metal foil to the guide member by means of the bonding mechanism, and shearing, after welding, the metal foil to a constant length by means of the cutting mechanism, to thereby produce a comb-like capacitor element member comprising the guide member and a plurality of rectangular metal foil pieces bonded to the guide member.
12. An apparatus for feeding metal foil automatically used in production of a monolayer capacitor element, characterized by comprising a constant-length feed mechanism, which in turn comprises at least a pair of pinch rollers for feeding tape-like metal foil while pinching the metal foil; means for rotating the pinch rollers by a constant amount; and drive means therefor, and which feeds the metal foil by a constant length.
13. The apparatus for feeding metal foil automatically as described in 12, wherein the constant-length feed mechanism comprises pinch rollers; a pinion gear provided at an axial end of one of the pinch rollers; a rack gear in meshing-engagement with the pinion gear; and drive means connected to the rack gear.
14. The apparatus for feeding metal foil automatically as described in 12, wherein the constant-length feed mechanism comprises pinch rollers; a pulley provided at an axial end of one of the pinch rollers; a power transmission belt looped around the pulley; and a stepping motor coupled with the belt.
15. The apparatus for feeding metal foil automatically as described in any one of 12 to 14, further comprising an automatic slack mechanism, which in turn comprises a reel for holding elongated tape-like metal foil in a rolled state; means for rotating the reel; and a position sensor disposed between the reel and the pinch rollers.
16. The apparatus for feeding metal foil automatically as described in any one of 12 to 15, further comprising a horizontal positioning mechanism, which in turn comprises a slide table disposed along the direction of feed of the metal foil; means for pressing the table laterally with respect to the direction of feed of the metal foil; and roll-like bearings arranged on the upper surface of the table in a standing condition so as to control the position of the metal foil in the width direction of the metal foil.
17. The apparatus for feeding metal foil automatically as described in any one of 12 to 16, further comprising a vertical positioning mechanism which prevents floating of the metal foil from the slide table.
18. The apparatus for feeding metal foil automatically as described in any one of 12 to 17, further comprising a dust removal mechanism, which in turn comprises blow means for blowing gas against the surface of the metal foil so as to blow off dust from the surface, and a suction pipe for drawing in the blown dust.
19. An apparatus for cutting metal foil, characterized by comprising vertically movable first and second cutting blades for shearing metal foil, the first cutting blade being supported via a shaft and pushed toward the second cutting blade by means of elastic force; and means for pushing the first cutting blade against the elastic force to thereby separate the first cutting blade from the second cutting blade, whereby a mechanism for separating and retracting the first and second cutting blades after cutting is formed.
20. The apparatus for cutting metal foil as described in 19, wherein the elastic force is produced by a metal spring, an air spring, or a rubber elastic material.
21. The apparatus for cutting metal foil as described in 19, wherein the elastic force is spring force.
22. The apparatus for cutting metal foil as described in any one of 19 to 21, comprising upper and lower blades for shearing the metal foil; frames supporting the upper and lower blades, respectively; and means for vertically moving the frames, wherein a base end portion of the lower blade is supported on a base portion of the upper blade by means of a shaft and via a spring; a distal end portion of the lower blade is supported on a lower blade frame by means of a shaft and via a spring, so that the lower blade is in close contact with the upper blade, and the lower blade can rotate about the base end portion thereof; and there is provided a press rod for pressing the lower end portion of the lower blade so as to separate the lower blade from the upper blade.

23. A method for cutting metal foil used in production of a monolayer capacitor element by shearing the metal foil through a scissorlike action, characterized in that, after cutting, a clearance is formed between cutting blades, which are then retracted while the clearance is maintained.

24. The method for cutting metal foil as described in 23, wherein the metal foil is valve metal foil of the monolayer capacitor element.

25. The method for cutting metal foil as described in 24, wherein the valve metal foil is formed of aluminum, tantalum, titanium, niobium, or an alloy thereof.

26. The method for cutting metal foil as described in any one of 23 to 25, wherein the clearance formed between the cutting blades falls within the range of 0.1 to 1.0 mm.

27. A metal foil produced by the cutting method as described in any one of 23 to 26.

28. The metal foil as described in 27, wherein the width of cracks formed on a cut surface of the metal foil is not greater than 0.1 mm.

29. The metal foil as described in 27, wherein the width of cracks formed on a cut surface of the metal foil is not greater than 0.05 mm.

30. A capacitor element comprising dielectric oxide film layer, semiconductor layer and conductor layer on the surface of the metal foil as described in 27.

BEST MODE FOR CARRYING OUT THE INVENTION

The present invention will next be described with reference to embodiments shown in drawings.

Figure 1:
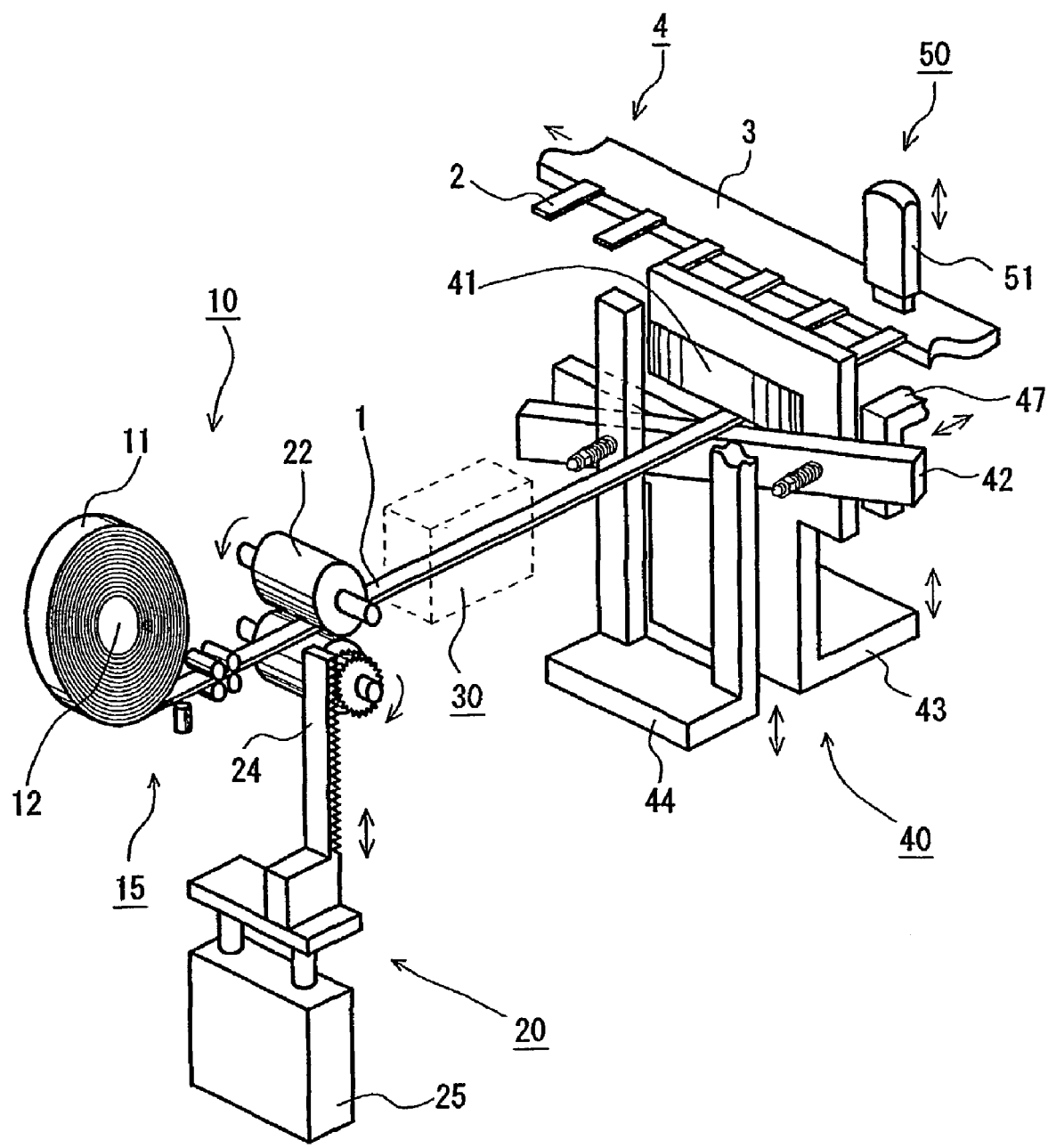
FIG. 1 is a schematic perspective view showing the overall structure of a production apparatus according to the present invention.
Figure 2:
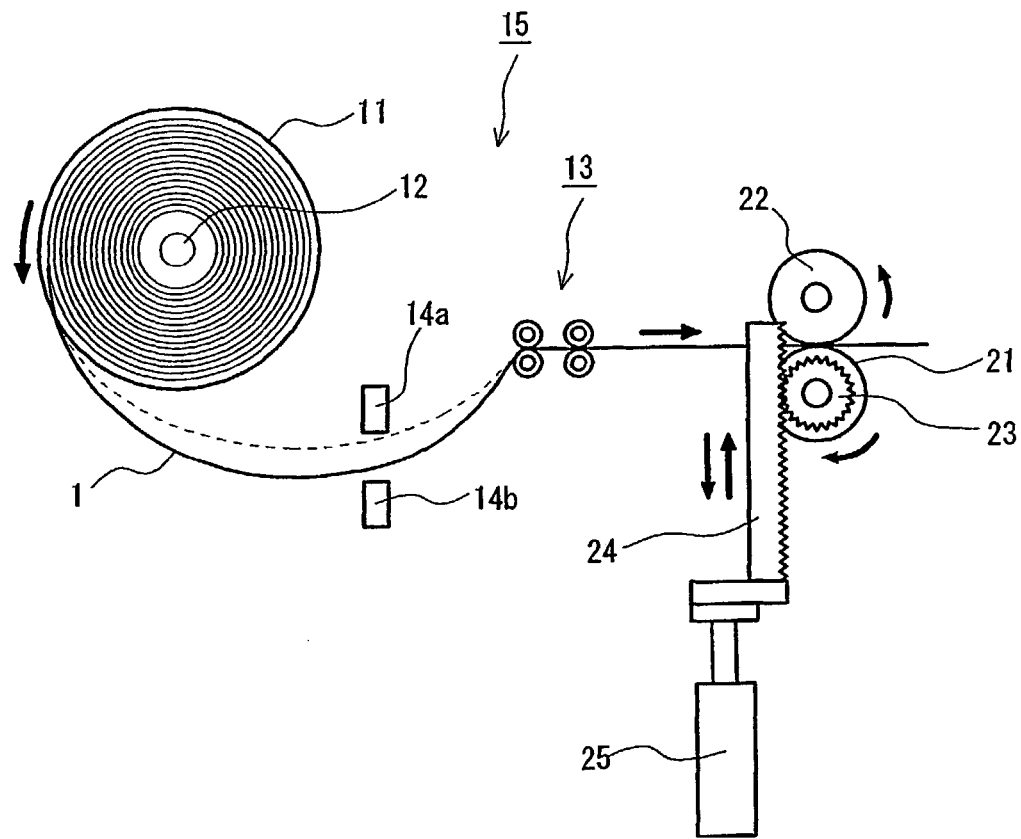
FIG. 2 is a schematic side view of an apparatus for feeding metal foil automatically.
Figure 3:
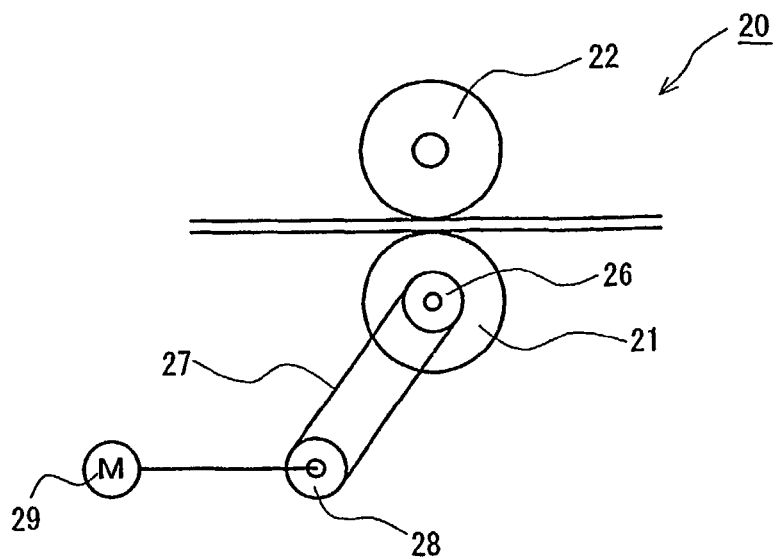
FIG. 3 is a schematic side view of an apparatus for feeding metal foil automatically using a stepping motor.
Figure 4:
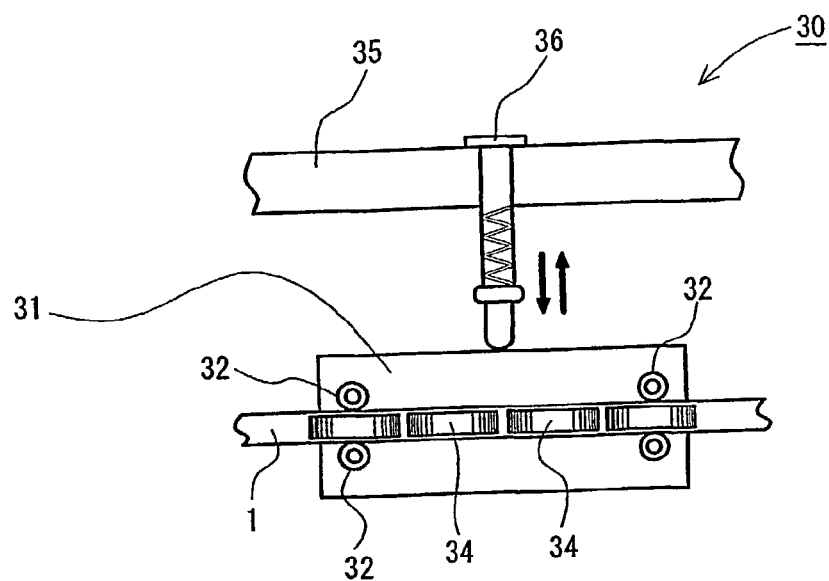
FIG. 4 is a schematic plan view of positioning means disposed in the apparatus for feeding metal foil automatically.
Figure 5:
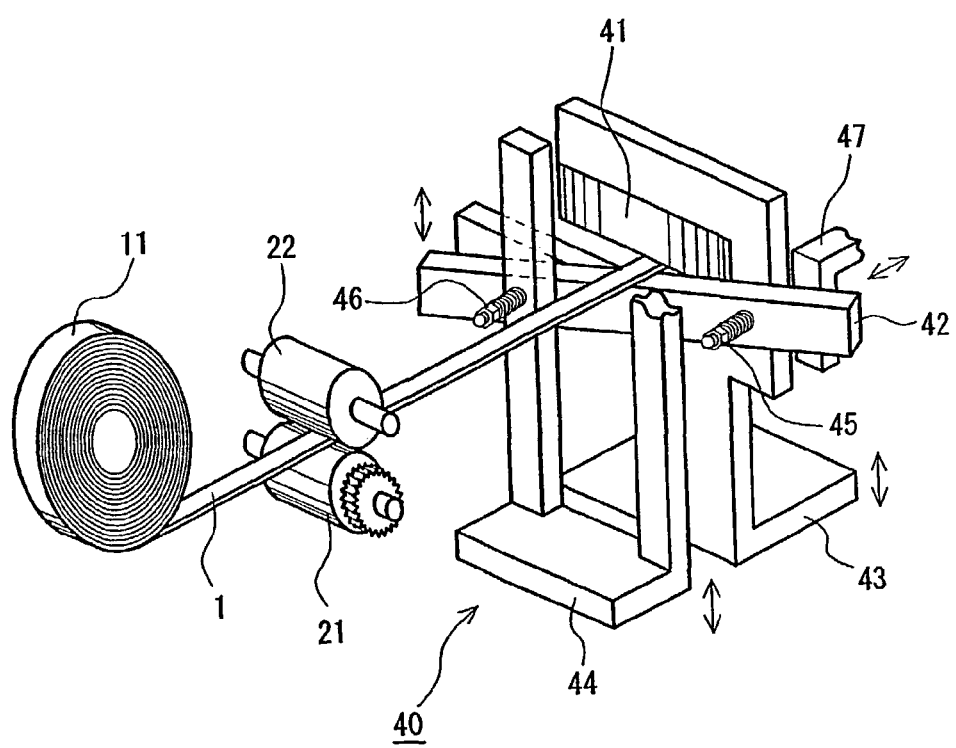
FIG. 5 is a schematic perspective view of an cutting apparatus for an elongated tape-like metal foil of the present invention.

FIG. 1 is a schematic perspective view showing the overall structure of a production apparatus according to the present invention. FIGS. 2 and 3 are schematic side views of automatic feed mechanisms. FIG. 4 is a schematic plan view of positioning means disposed in the automatic feed mechanism. FIG. 5 is a schematic perspective view of a cutting mechanism(apparatus). FIG. 6(a) to (h) is a series of views for explaining a series of operations ranging from bonding of metal foil to cutting of the metal foil. In FIGS. 1 and 5, a portion of the frame of the cutting mechanism is partially eliminated.

The illustrated apparatus for producing a capacitor element member of the present invention includes an automatic feed mechanism 10 for feeding elongated tape-like metal foil 1 by a constant length toward a guide member 3, a mechanism 50 for bonding an end of the metal foil 1 to the guide member 3, and a mechanism 40 for cutting the bonded metal foil 1 to produce a rectangular metal foil piece 2 of predetermined length, to thereby produce a comb-like capacitor element member including the guide member 3 and a plurality of metal foil pieces 2 bonded, in parallel to one another, to a side edge of the guide member 3. A dielectric oxide film layer, a semiconductor layer, and a conductor layer are sequentially formed on each of the rectangular metal foil pieces 2 of the comb-like capacitor element member. Finally, the thus-processed metal foil pieces 2 are cut from the guide member to become monolayer solid electrolytic capacitor elements. The apparatus for producing a capacitor element member of the present invention is used in a production line for producing such solid electrolytic capacitor elements.

The apparatus configuration shown in FIG. 1 is such that the metal foil 1 is fed toward a side of the moving guide member 3 and such that the automatic feed mechanism 10, a positioning mechanism 30, the cutting mechanism 40, and the bonding mechanism 50 are sequentially disposed along the feed direction of the metal foil 1. The guide member 3 is located downstream of the cutting mechanism 40. The bonding mechanism 50 is located above the guide member 3. The individual mechanisms and examples of apparatus using the mechanism are described specifically below.

(A) Automatic Feed Mechanism

Figure 7:
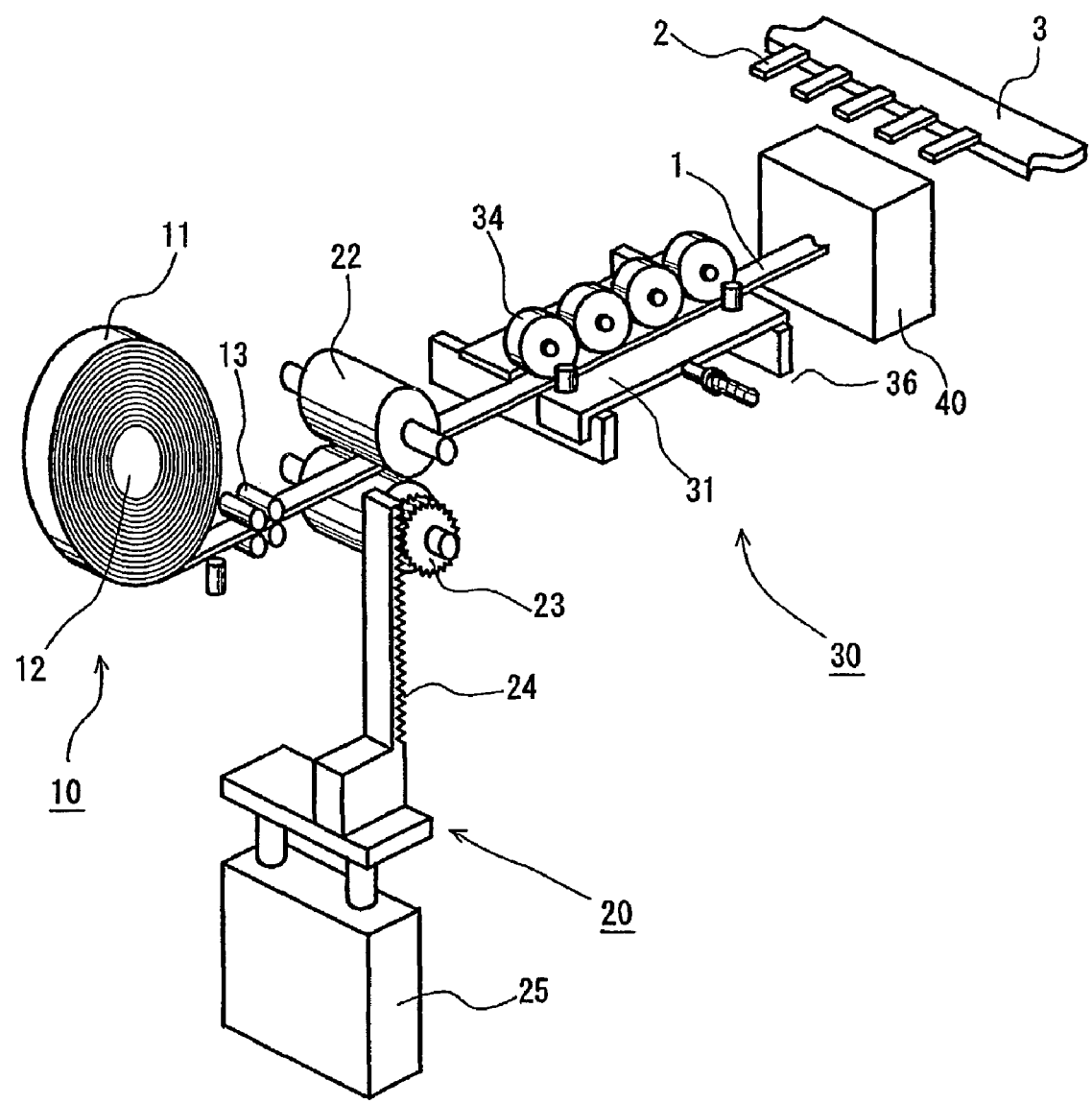
FIG. 7 is a partial perspective view showing an apparatus for feeding metal foil automatically according to the present invention.
Figure 8:
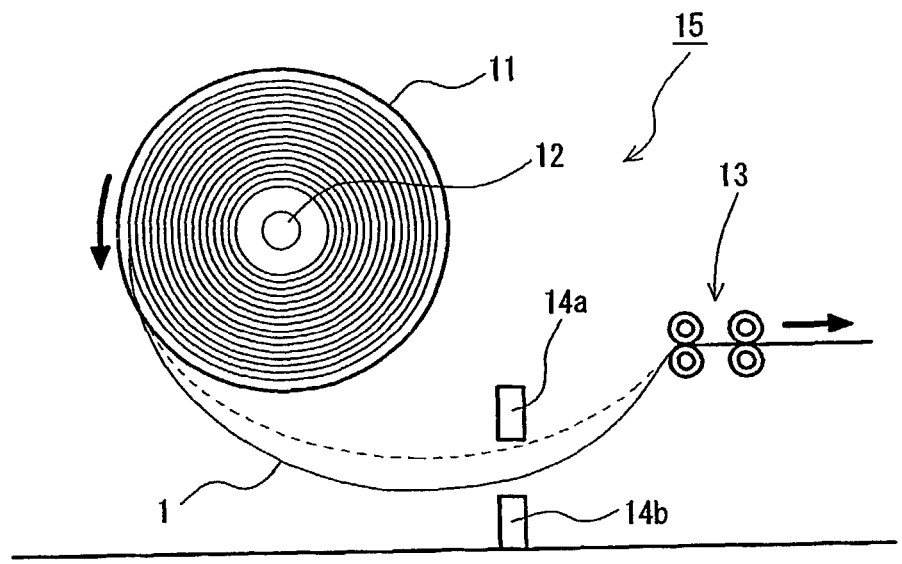
FIG. 8 is a Schematic view of an automatic slack apparatus.
Figure 9:
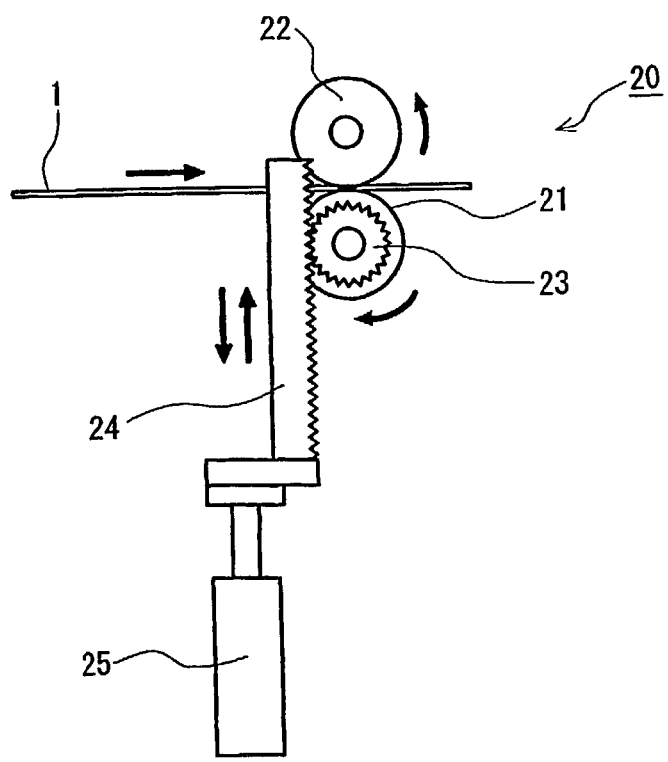
FIG. 9 is a schematic view of a constant-length feed mechanism using a gear mechanism.
Figure 10:
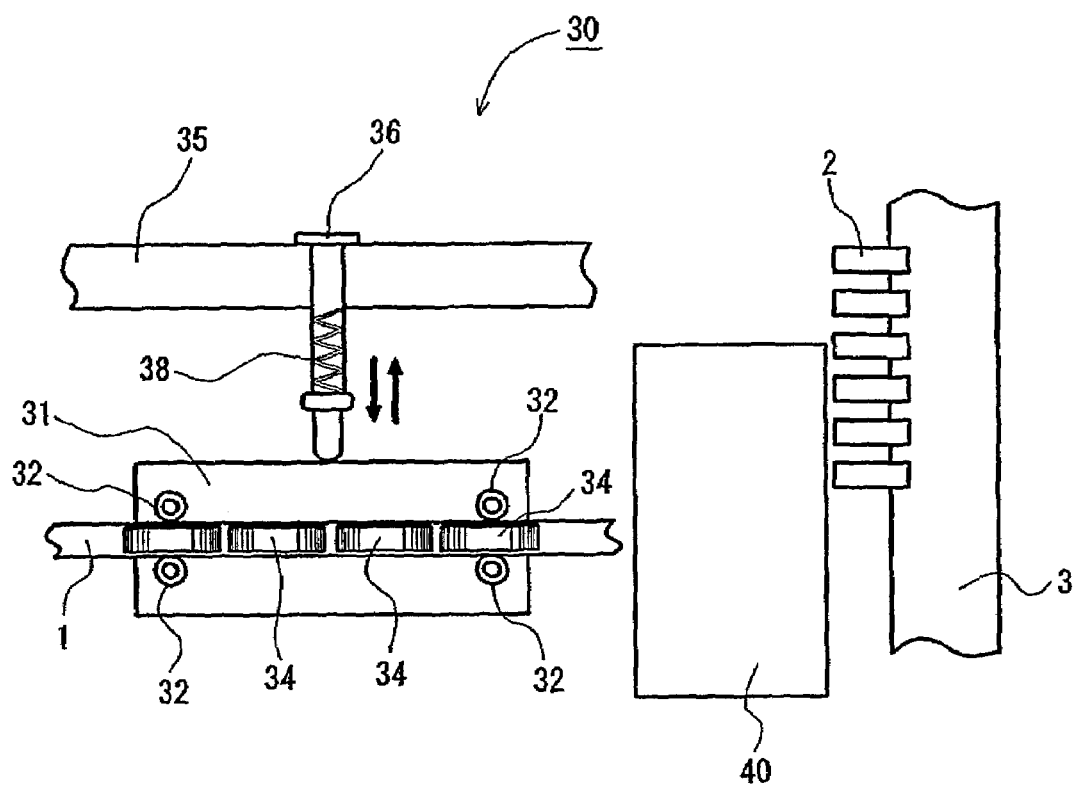
FIG. 10 is a schematic plan view of a positioning mechanism.
Figure 11:
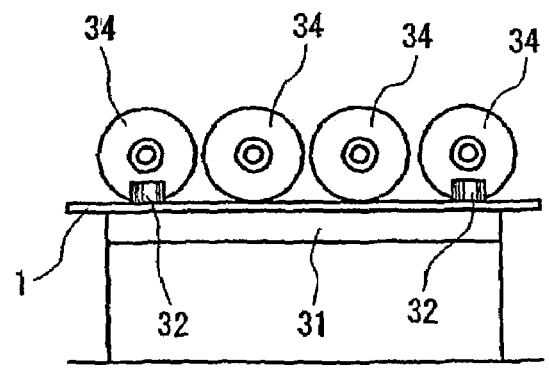
FIG. 11 is a schematic front view of the positioning mechanism.
Figure 12:
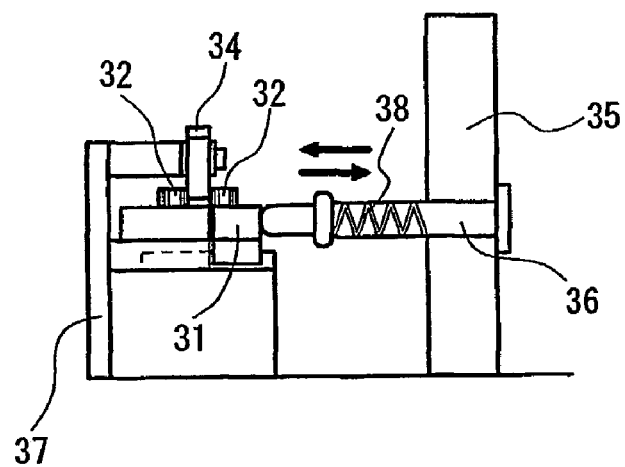
FIG. 12 is a schematic side view of the positioning mechanism.
Figure 13:
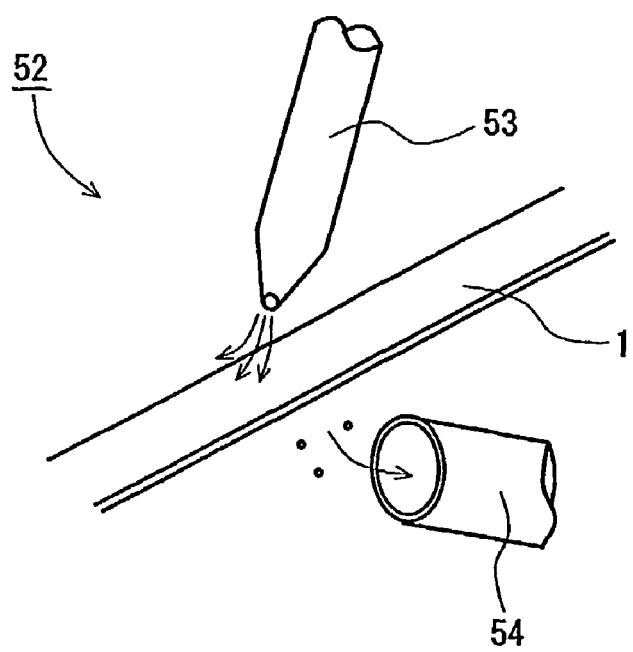
FIG. 13 is a schematic view of a dust removal mechanism.

FIG. 7 is a partial perspective view showing an apparatus for feeding metal-foil automatically used in an apparatus for producing capacitor element member according to the present invention. FIG. 8 is a schematic view of an automatic slack apparatus. FIGS. 9 and 3 are schematic views of a constant-length feed mechanism. FIGS. 10 to 12 are schematic views of a mechanism for positioning metal foil in horizontal and vertical directions. FIG. 13 is a schematic view of a dust removal mechanism.

The apparatus for feeding metal-foil automatically 10 of the present invention shown in the drawings includes means for holding elongated tape-like metal foil 1 in a rolled state; an automatic slack mechanism 15 for drawing the metal foil without damaging or deforming it; a constant-length feed mechanism 20 for feeding the metal foil 1 by a constant length; and a positioning mechanism 30 for positioning in the horizontal and vertical directions the fed portion of the metal foil having the constant length. The positioned metal foil 1 is guided to a bonding/cutting apparatus 40. The bonding/cutting apparatus 40 bonds an end of the metal foil 1 to a side edge of a metallic guide 3, and then cuts the bonded metal foil 1 to a constant length. Through repetition of the bonding and cutting operations, there is produced a comb-like capacitor element member including the metallic guide 3 and a plurality of metal foil pieces 2 bonded, in parallel to one another, to a side edge of the metallic guide 3. A dielectric oxide film layer, a semiconductor layer, and a conductor layer are sequentially formed on each of the rectangular metal foil pieces 2 of the comb-like capacitor element member. Finally, the thus-processed metal foil pieces 2 are cut from the guide member to become monolayer solid electrolytic capacitor elements. The apparatus for feeding metal-foil automatically of the present invention is used in such a production line in order to feed the elongated tape-like metal foil to the bonding/cutting apparatus.

The elongated tape-like metal foil 1 wound around a reel 11 is guided to the constant-length feed mechanism 20. The apparatus for feeding metal foil automatically 10 of the present invention has the automatic slack mechanism 15 for preventing imposition of a tensile force on the metal foil 1 extending between the reel 11 and the constant-length feed mechanism 20. The automatic slack mechanism 15 shown in the FIG. 8 includes the reel 11 for holding the elongated tape-like metal foil 1 in a rolled state; rotation means 12 for the reel 11; pinch rollers 13 which rotate while pinching the metal foil 1 drawn from the reel 11; and a position sensor 14 disposed between the reel 11 and the pinch rollers 13. The position sensor 14 is used to detect the vertical position of the drawn portion of the tape-like metal foil 1 and includes an upper-limit sensor 14a disposed above the metal foil 1 and a lower-limit sensor 14b disposed below the metal foil 1. These sensors are generally of noncontact type, such as photosensors.

When a tensile force acts on the metal foil, the metal foil breaks or the metal foil stretches with a resultant change in foil capacitance. Therefore, In order to prevent tensile force from acting on the metal foil 1 in a region between the reel 11 and the constant-length feed mechanism 20, the reel 11 is rotated in a feed direction by means of the rotation means 12 such that the drawn portion of the metal foil 1 slacks at all times. When the amount of slack becomes small with the metal foil 1 being pulled upward, the upper-limit sensor 14a detects this state and sends a relevant instruction to the rotation means 12 so as to rotate the reel 11 in the feed direction, to thereby increase slack in the metal foil 1. When the amount of slack in the metal foil 1 is too large, the metal foil 1 comes into contact with a table and is thus contaminated or scratched. Therefore, when the lower-limit sensor 14b detects the metal foil 1, the lower-limit sensor 14b sends a relevant instruction to the rotation means 12 so as to restrict rotation of the reel 11. Thus, slack in the metal foil 1 is reduced.

The constant-length feed mechanism 20 feeds the tape-like metal foil 1 by a constant length and includes at least a pair of pinch rollers 21 and 22 for pinching and feeding the metal foil 1, a means for rotating the pinch rollers 21 and 22 by a constant amount, and a drive means therefor. In the example shown in FIG. 9, the pinch roller 21 located on the lower side of the metal foil 1 serves as a drive roller and contains a unidirectional clutch. A pinion gear 23 is attached to a shaft end of the drive roller 21 and is engaged with a rack gear 24. A drive means 25, such as an actuator, is connected to the rack gear 24. The surfaces of the pinch rollers 21 and 22 in contact with the metal foil are preferably made of a wear-resistant synthetic resin in order to prevent damage to the metal foil and maintain accuracy in feed length.

The constant-length feed mechanism 20 functions in the following manner. The metal foil 1 is vertically pinched by the drive pinch roller 21 and the follower pinch roller 22. The actuator or a like device 25 causes the rack 24 to reciprocate along a constant length, and the pinion gear 23 rotates accordingly. Rotation of the pinion gear 23 is transmitted to the drive roller 21 via the contained unidirectional clutch. As a result, the drive roller 21, together with the follower roller 22, feeds the metal foil 1 by a constant length. In the example shown in FIG. 9, the unidirectional clutch is engaged only when the rack 24 rises, thereby causing rotation of the roller 21 and thus causing feed of the metal foil 1. When the rack 24 lowers, the unidirectional clutch is disengaged, so that the metal foil is not fed. The distance of movement of the rack 24 determines the length of feed of the metal foil 1. No limitation is imposed on the driving system of the actuator 25, and either of an air cylinder and a cam drive may be used. The drive roller 21 and the follower roller 22 may reverse their driver-follower relation. Alternatively, the pinch rollers 21 and 22 may both be drive rollers.

The constant-length feed mechanism 20 shown in FIG. 3 employs a stepping motor 29 as an actuator and employs a timing belt 27 in place of a rack gear. A power transmission belt 27 is looped around and extends between a pulley 26 attached to a shaft end of the pinch roller 22 and a pulley 28 connected to the stepping motor 29. The belt is preferably toothed. The rotational speed of the motor 29 is controlled by means of pulse or a like parameter, to thereby transmit a fine, accurate, equal-angle-of-rotation motion to the pinch roller 21. As a result, the pinch rollers 21 and 22 rotate by a constant angle of rotation, to thereby feed the metal foil 1 by a constant length.

The metal foil 1 supplied from the reel 11 is maintained in a non-restrained state by means of the above-described slack mechanism 15. Therefore, in order to weld the metal foil 1 to a predetermined position of the metallic guide 3, the following positioning mechanism is preferably provided. The positioning mechanism 30 shown in FIGS. 10 to 12 includes a horizontal positioning mechanism and a vertical positioning mechanism. The horizontal positioning mechanism includes a slide table 31 disposed along the direction of feed of the metal foil 1, a press means (press rod) 36 for pressing the table 31 laterally with respect to the direction of feed of the metal foil 1, and roll-like bearings (miniature bearings) 32 arranged on the upper surface of the table 31 in a standing condition so as to control the position of the metal foil 1 in the width direction of the metal foil 1. The vertical positioning mechanism presses the metal foil 1 against the upper surface of the table 31 to thereby prevent floating of the metal foil 1 above the upper surface of the table 31.

The roll-like bearings 32 are arranged at opposite sides of the metal foil 1 in a standing condition (two pairs are provided in the illustrated example) on the upper surface of the table 31. By means of the bearings 32, the horizontal position of the metal foil 1 is controlled. The slide table 31 is arranged on a stand 37 in such a manner as to be able to slide laterally with respect to the direction of feed of the metal foil 1. The press rod 36 is disposed to extend along the slide direction. The press rod 36 is supported via a spring 38 on a frame 35 located at the side of the table 31. The spring force of the spring 38 causes the press rod 36 to press the table 31 laterally. Through adjustment of the amount by which the press rod 36 is screwed in, the pressing force of the press rod 36 is controlled to thereby adjust the horizontal position of the table 31. The spring 38 is not limited to a metal spring, but is can be made of any elastic material that have an elastic force.

In the illustrated apparatus, four guide rollers 34, which constitute the vertical positioning mechanism, are disposed on the upper side of the table 31. The guide rollers 34 are supported, via shafts, on the stand 37 in such a manner that the guide rollers 34 can rotate in a direction corresponding to the feed direction of the metal foil 1 while maintaining a gap of several tens of microns above the surface of the metal foil traveling on the upper surface of the table 31, thereby suppressing floating of the metal foil above the upper surface of the table 31. In place of the guide rollers 34, the vertical positioning mechanism may be constituted by a plate member or a belt-like member. In the illustrated example of the apparatus, the positioning mechanism 30 is located downstream of the constant-length feed mechanism 20 as viewed from the reel 11 in the feed direction. However, the order of arrangement may be reversed; i.e., the constant-length feed mechanism 20 may be located downstream of the positioning mechanism 30.

Powder cuttings generated during slitting may adhere to the surface of the metal foil 1 formed through slitting. The apparatus for feeding metal foil automatically of the present invention has a mechanism 52 for removing such dust. The dust removal mechanism 52 shown in FIG. 13 includes blow means 53 for blowing gas against the surface of the metal foil 1 so as to blow off dust, and a suction pipe 54 for drawing in the blown dust. The blow means 53 may be composed of a blow nozzle directed toward the metal foil surface and a supply means for supplying compressed gas (e.g., compressed air). The mechanism 52 is covered by a cover (not shown) in order to prevent scattering of dust, which scattering would otherwise occur due to compressed gas. The dust removed from the surface of the metal foil is drawn by, for example, a vacuum cleaner or the like via the suction pipe 54, and is discharged to the outside of the system. The dust removal mechanism 52 may be located somewhere between the automatic slack mechanism 15, the constant-length feed mechanism 20, and the positioning mechanism 30. Preferably, the dust removal mechanism 50 is located between the automatic slack mechanism 15 and another mechanism.

(B) Cutting Apparatus

Figure 14:
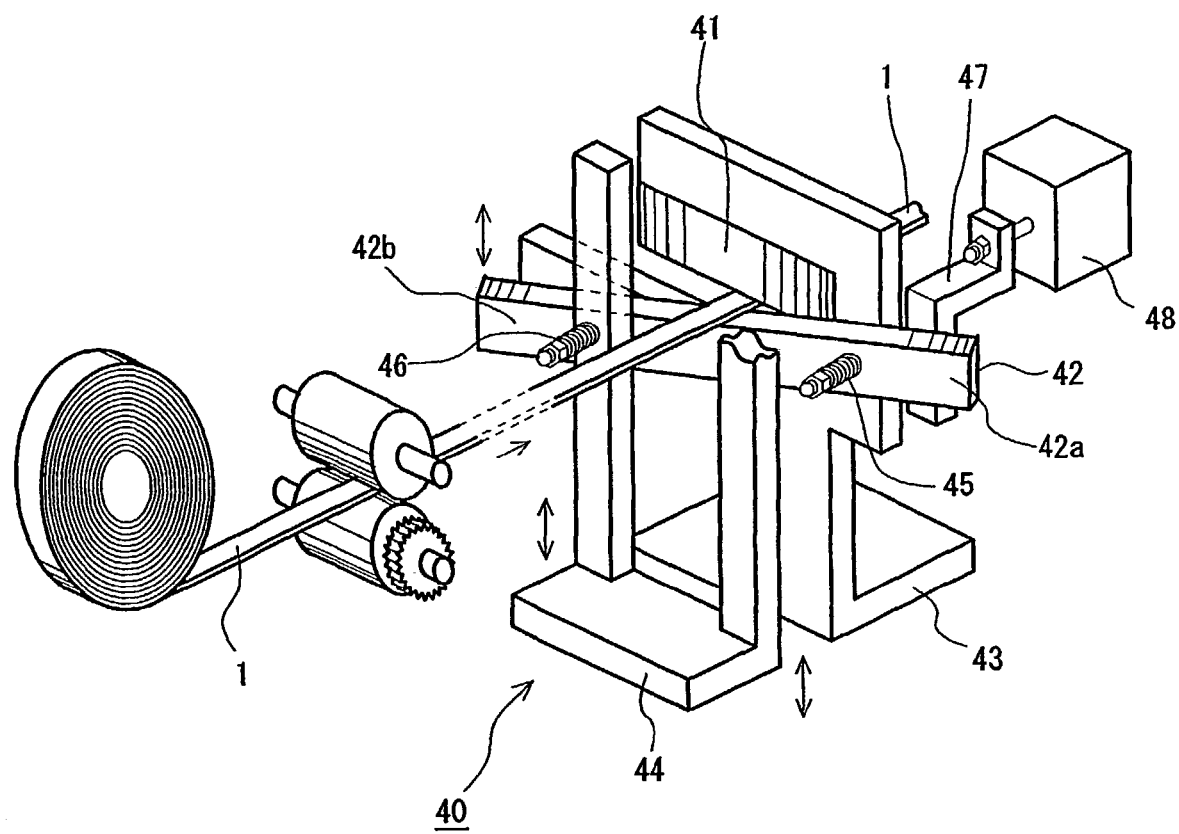
FIG. 14 is a schematic perspective view showing the structure of a cutting apparatus according to the present invention.
Figure 15:
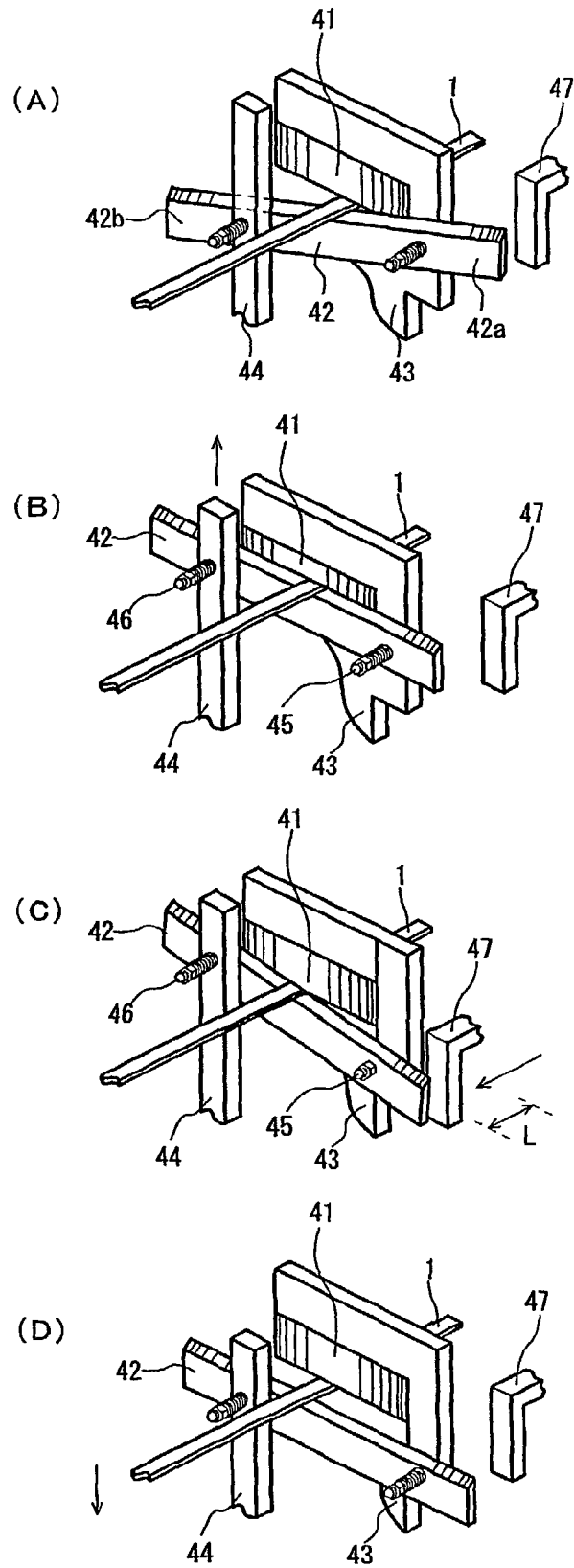
FIGS. 15(A), (B), (C), and (D) is a process charts showing steps of a cutting process.
Figure 16:
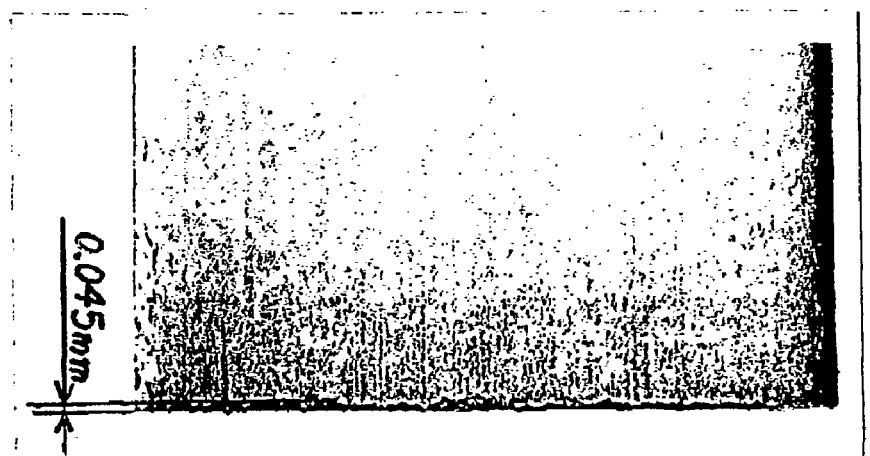
FIG. 16 is a microphotograph showing a cut surface of metal foil cut by use of the cutting apparatus of the present invention.
Figure 17:
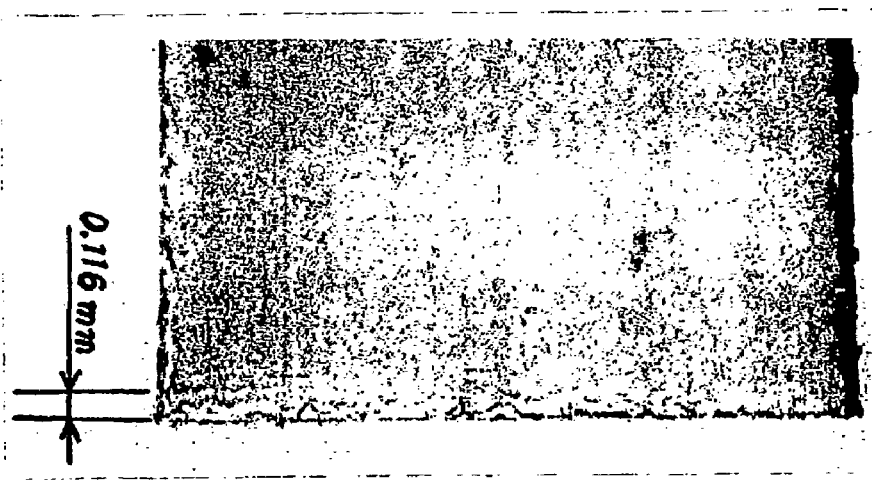
FIG. 17 is a microphotograph showing a cut surface of metal foil cut by use of dressmaking scissors.
Figure 18:
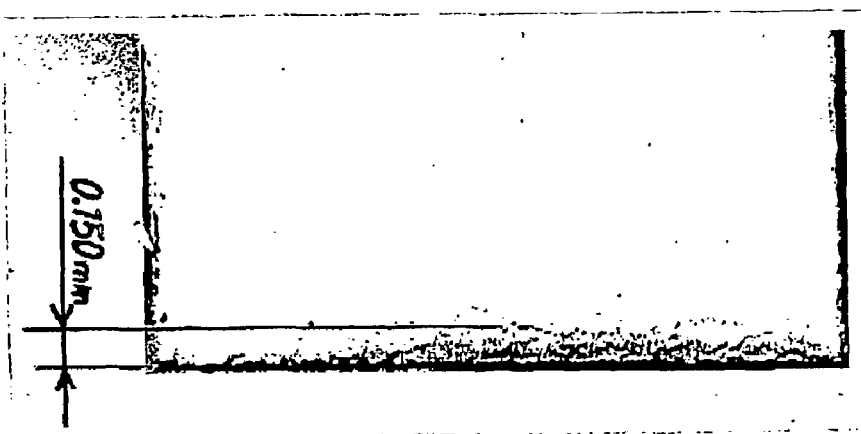
FIG. 18 is a microphotograph showing a cut surface of metal foil cut by use of surgical scissors.
Figure 19A:
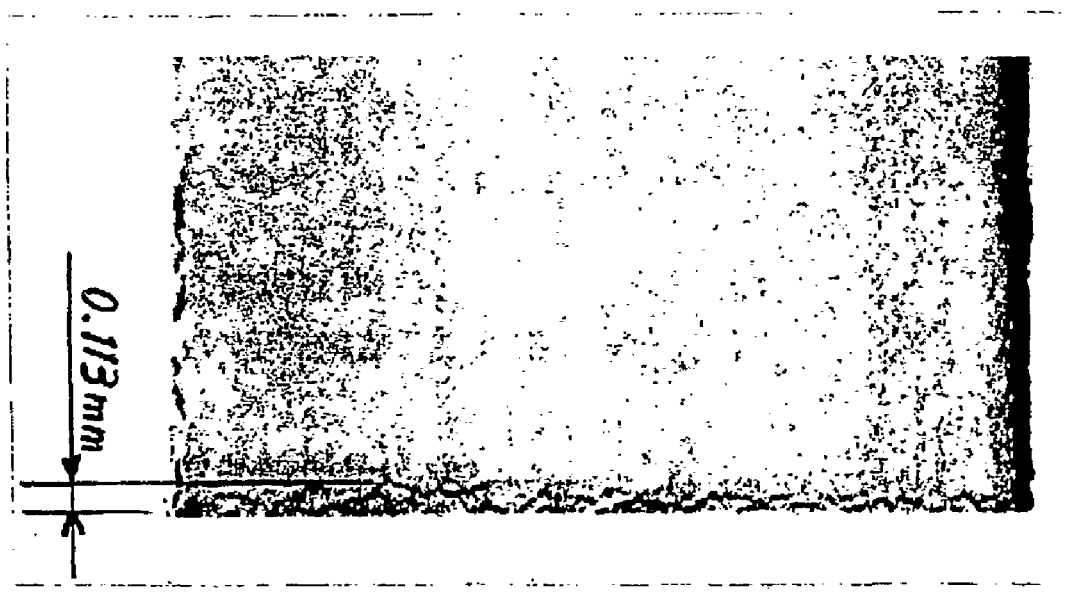
FIGS. 19(A) and (B) is a microphotographs showing cut surfaces of metal foil cut by use of a paper cutter.
Figure 19B:
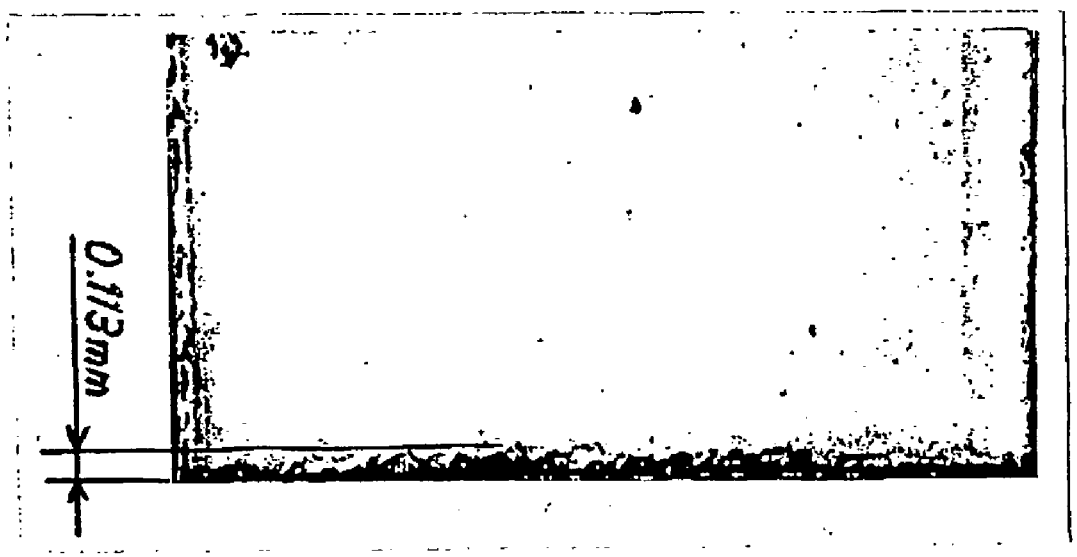

FIG. 14 is a schematic perspective view showing a structure of a cutting apparatus for an elongated tape-like metal foil used for an apparatus for producing a capacitor element member according to the present invention. FIG. 15 is an explanatory view showing operation thereof. In FIGS. 14 and 15(A)~(D), a portion of the frame of the cutting mechanism is partially eliminated.

The cutting apparatus illustrated in FIG. 14 is a shear cutting apparatus in which metal foil is sheared by a scissor-like action and is characterized in that, after cutting, a clearance is formed between cutting blades, which are then retracted while the clearance is maintained. The cutting apparatus of the present invention is characterized by comprising vertically movable first and second cutting blades for shearing metal foil, the first cutting blade being supported via a shaft and pushed toward the second cutting blade by means of elastic force; and means for pushing the first cutting blade against the elastic force to thereby separate the first cutting blade from the second cutting blade, whereby a mechanism for separating and retracting the first and second cutting blades after cutting is formed.

In the cutting apparatus of the present invention, the first cutting blade is supported via a shaft and is pushed toward the second cutting blade by means of elastic force. In general, elastic force is generated by an elastic member having been elastically deformed due to application of an external force when the elastic member is restored to its original state. The elastic force can be produced by means of a rubber elastic material such as natural rubber, vulcanized rubber, or silicone rubber; a metal spring such as a coil spring, plate spring, or spiral spring; or an air spring utilizing the compressibility of air. Among them, the metal spring can be used as a mechanical element. In the apparatus illustrated in FIG. 14, a metal spring is used.

As shown in FIG. 14, a cutting mechanism 40 includes an upper blade 41 and a lower blade 42 arranged such that the metal foil 1 extends therebetween. The upper blade 41 is integrally formed with an upper-blade frame 43. One end (base end portion) 42a of the lower blade 42 is supported rotatably on the upper-blade frame 43 by means of a shaft and via a spring 45. The other end (distal end portion) 42b is supported rotatably on a press frame 44 by means of a shaft and via a spring 46. These frames 43 and 44 are connected to respective drive means (not shown), such as respective actuators and are vertically movable. The lower blade 42 is pressed against the upper blade 41 by means of the springs 45 and 46 located at opposite end portions thereof so as to prevent generation of a clearance(space) between the upper blade 41 and the lower blade 42 during cutting.

The cutting mechanism 40 includes a mechanism for separating and retracting the cutting blades with generation of a clearance after cutting. The retreat mechanism includes a press rod 47 for pressing the lower blade 42 against a spring force. The press rod 47 is disposed in such a manner as to project toward a base end portion of the lower blade 42 and is connected to drive means 48, such as an actuator, in such a manner that the press rod 47 can reciprocate. A distal end portion of the press rod 47 extends downward so as to ensure that the distal end portion of the press rod 47 does not disengage from the lower blade 42 even when the upper blade 41 and the lower blade 42 move vertically. Notably, the press rod 47 may be disposed at the distal end side of the lower blade 42 or at both the distal end side and the base end side of the lower blade 42.

When, as shown in FIG. 15(A), the frame 44 rises while pressing in a state in which the metal foil 1 is located between the upper blade 41 and the lower blade 42, the distal end portion 42b of the lower blade 42, which is rotatably supported on the frame 44 by means of a shaft, is pressed upward together with the frame 44. As a result, the lower blade 42 is rotated about the base end portion 42a, which is rotatably supported on a base end portion of the upper blade 41 by means of a shaft. As a result of rotation of the lower blade 42, the metal foil 1 extending between the upper blade 41 and the lower blade 42 is cut (FIG. 15(B)).

After the metal foil 1 is cut, the press rod 47 is moved forward by drive means 48 in order to press the lower blade 42 toward the frame against the spring force (FIG. 15(C)), thereby establishing a clearance (L) between the upper and the lower blades 41 and 42 (FIG. 15(C)). The lower blade 42 is lowered to its standby position while the clearance L is maintained (FIG. 15(D)). Thus, potential damage to the cut surface of the metal foil can be suppressed to the greatest possible extent, and deformation of the cut surface and generation of burrs or cracks on the cut surface can be prevented. The clearance (L) is 0.1-1.0 mm, preferably 0.2-0.8 mm, more preferably 0.3-0.7 mm. This retreat mechanism preferably decreases the width of cracks generated on the cut surface of the metal foil to the range of 0.1 to 1.0 times the thickness of the metal foil, more preferably, to the range of 0.1 to 0.8 times the thickness of the metal foil, further preferably, to the range of 0.1 to 0.5 times the thickness of the metal foil.

The blades are formed of a hard material, such as stainless steel, ceramic, diamond, high speed steel or hardmetal, which has a hardness greater than that of the metal foil. Among them, high speed steel, stainless steel and ceramic are preferred. The tape-like metal foil is formed of aluminum, tantalum, titanium, niobium, or an alloy thereof, which can be used as a valve metal of a monolayer capacitor element. The metal foil preferably has a thickness of 10 to 300 µm, more preferably 10 to 200 µm, still more preferably, 10 to 120 µm. The metal foil has a width of 0.5 to 100 mm, preferably 1 to 50 mm.

A piece of aluminum foil (width: 3 mm, thickness: 100 µm) was cut by use of the cutting apparatus (cutting unit), as shown in FIG. 14, of the present invention, commercially available dressmaking scissors, surgical scissors, and a paper cutter. FIGS. 16, 17, 18, 19(A), and 19(B) show microphotographs of the respective cut surfaces. The width of the cut surface formed through cutting by use of the cutting unit of the present invention was 0.045 mm (FIG. 16), indicating that almost no cracks were produced. By contrast, the width of cracks on the cut surface formed through cutting by use of the commercially available dressmaking scissors was 0.116 mm (FIG. 17); the width of cracks on the cut surface formed through cutting by use of the surgical scissors was 0.150 mm (FIG. 18); and the width of cracks on the cut surface formed through cutting by use of the paper cutter was 0.113 mm (FIGS. 19(A) and 19(B)). In each of these cases, the crack width was about three times that in the case where the cutting unit of the present invention was used.

(C) Bonding Mechanism

In FIG. 1, the bonding mechanism 50 is adapted to bond an end of the metal foil 1 to the guide member 3 and includes means for mechanical bonding such as caulking, soldering, resistance welding, or laser beam welding. For continuous bonding for the metal foil, a spot welding machine or a laser beam welding machine is preferred. In economic view, the spot welding machine is more preferred. As shown in FIG. 1, a head (electrode) 51 of a welding machine is disposed above the guide member 3 in a vertically movable condition. Preferably, for continuous welding, an automatic polishing means (not shown) for the electrode 51 is employed. The welding head 51 moves vertically according to the state of feed of the metal foil 1 and the operation of the cutting mechanism and welds an end of the metal foil 1 to the guide member 3.

Figure 6:
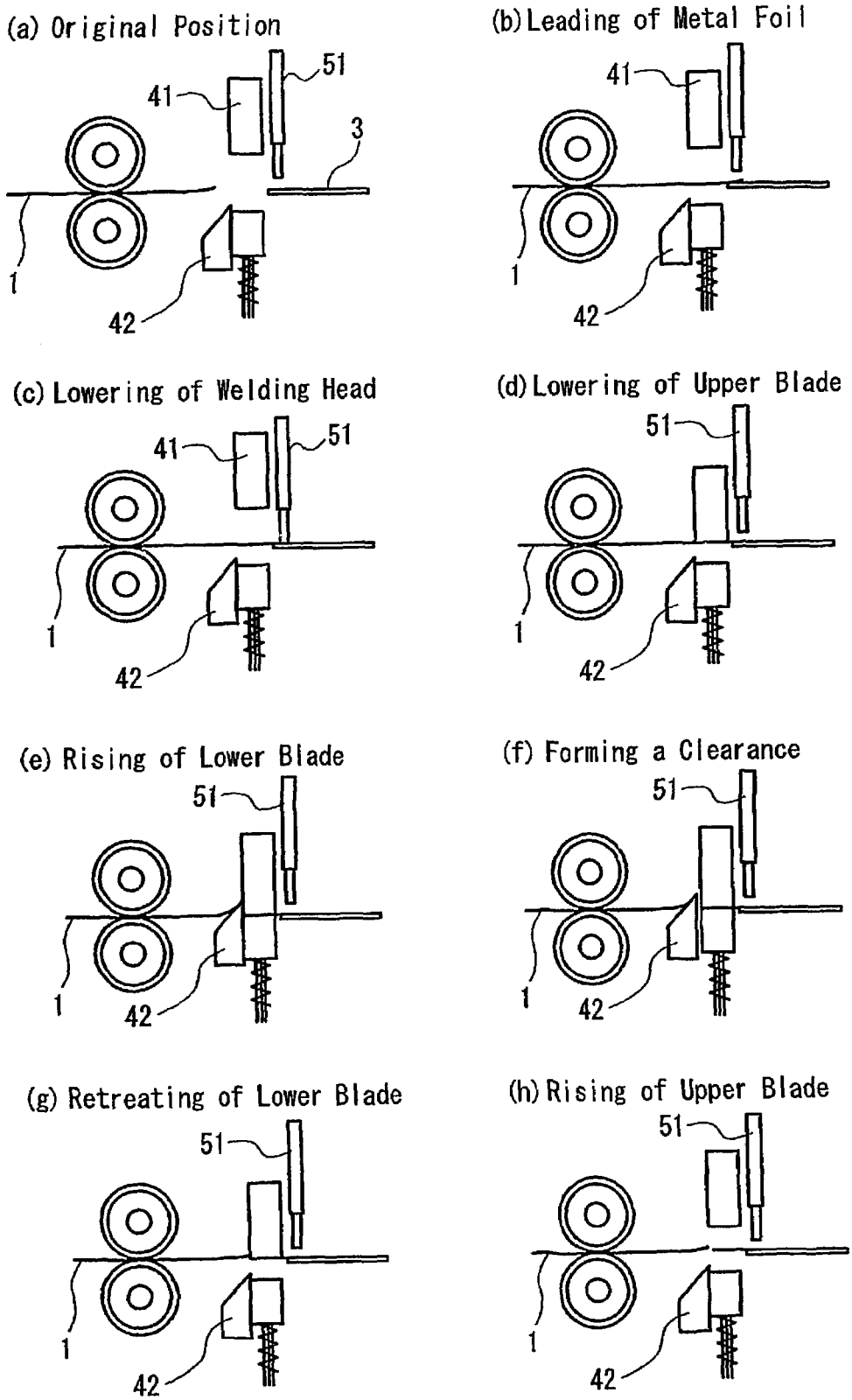
FIG. 6 is series of views for explaining a series of operations ranging from bonding of metal foil to cutting of the metal foil.

Next, a bonding/cutting actions by use of the bonding mechanism 50 are explained. As shown in FIG. 6, the automatic feed mechanism 10 feeds the tape-like metal foil 1 by a constant length from the original position (FIG. 6(a)). When a leading end of the metal foil 1 reaches a side edge of the guide member (FIG. 6(b)), the welding head 51 lowers and welds the end of the metal foil 1 to the guide member under pressure (FIG. 6(c)). After welding, while the welding head 51 rises away from the weld zone, the upper blade 41 lowers to a cutting position (FIG. 6(d)). Next, the lower blade 42 rises and comes into close contact with the upper blade 41 to thereby cut the metal foil 1 (FIG. 6(e)). After cutting, the press rod 47 presses the lower blade 42 away from the upper blade 41 to thereby form a clearance therebetween (FIG. 6(f)). While the clearance is maintained, the lower blade 42 retreats downward (FIG. 6(g)). The upper blade 41 rises (FIG. 6(h)) and returns to its original position to stand by for the next cutting operation. During the welding head 51 lowering again from its original position, the electrode thereof is polished by means of an automatic polishing apparatus.

When the metal foil 1 is cut and the upper blade 41 and the lower blade 42 retreat their original positions, the guide member 3 is fed forward by a constant length and stands by for next bonding of the metal foil adjacent to the bonded rectangular metal foil piece 2. Then, the apparatus of the present invention repeats the above-mentioned series of welding operations, thereby sequentially bonding the rectangular metal foil pieces 2 to the side edge of the guide member 3 and thus yielding a capacitor element member 4 of a comb-like shape.

While the present invention has been described with reference to the preferred embodiments, the present invention is not limited thereto, and the structure of the apparatus may be modified in various ways without departing from the technical idea of the present invention.

INDUSTRIAL APPLICABILITY

The production apparatus of the present invention feeds metal foil by a constant length without damaging the metal foil, bonds continuously a leading end of the metal foil to a metallic guide member, and cuts the bonded metal foil while generation of burrs and cracks is suppressed to the greatest possible extent, whereby monolayer capacitor elements can be produced at good productivity.

The invention claimed is:

1. An apparatus for producing a capacitor element member to be used in production of monolayer capacitor elements, characterized by comprising an automatic feed mechanism for feeding metal foil by a constant length toward a guide member, a mechanism for bonding the metal foil to the guide member, and a mechanism for cutting the bonded metal foil,
   wherein the mechanism for bonding the metal foil to the guide member is a mechanism for bonding only one end of the metal foil, but not a second end of the metal foil, to the guide member, and
   wherein the cutting mechanism shears the metal foil by a scissorlike action and comprises a mechanism for, after cutting, retreating cutting blades while maintaining a clearance therebetween.

2. The apparatus for producing a capacitor element member as claimed in claim 1, wherein the automatic feed mechanism comprises a constant-length feed mechanism for feeding the metal foil by a constant length, a slack mechanism for adjusting slack in the metal foil drawn from a reel, and a positioning mechanism for adjusting a feed position of the metal foil.

3. The apparatus for producing a capacitor element member as claimed in claim 1, wherein the automatic feed mechanism comprises a constant-length feed mechanism for feeding the metal foil by a constant length, a slack mechanism for adjusting slack in the metal foil drawn from a reel, a positioning mechanism for adjusting a feed position of the metal foil, and a mechanism for removing dust from a surface of the metal foil.

4. The apparatus for producing a capacitor element member as claimed in any one of claims 1 to 3, wherein the bonding mechanism comprises welding means.

5. The apparatus for producing a capacitor element member as claimed in claim 4, wherein the welding means of the bonding mechanism is a spot-welding mechanism.

6. The apparatus for producing a capacitor element member as claimed in claim 4, wherein the bonding mechanism is a continuous spot-welding mechanism and further comprises a polishing mechanism for polishing an electrode.

7. The apparatus for producing a capacitor element member as claimed in claim 1, wherein the automatic feed mechanism, the cutting mechanism, and the bonding mechanism are sequentially disposed along a direction of feed of the metal foil.

8. An apparatus for producing a capacitor element member to be used in production of monolayer capacitor elements, characterized by comprising an automatic feed mechanism for feeding metal foil by a constant length toward a guide member, a mechanism for bonding the metal foil to the guide member, and a mechanism for cutting the bonded metal foil,
   wherein the automatic feed mechanism, the bonding mechanism, and the cutting mechanism are sequentially disposed in order of firstly the automatic feed mechanism, secondly the bonding mechanism and thirdly the cutting mechanism along a direction of feed of the metal foil.

9. An apparatus for producing a capacitor element member to be used in production of monolayer capacitor elements, characterized by comprising an automatic feed mechanism for feeding metal foil by a constant length toward a guide member, a mechanism for bonding one end of the metal foil to the guide member, and a mechanism for cutting the bonded metal foil,
   wherein the apparatus repeats a series of steps of feeding the metal foil by a constant length by means of the automatic feed mechanism until an end of the metal foil reaches the guide member, welding under pressure the end of the metal foil to the guide member by means of the bonding mechanism, and shearing, after welding, the metal foil to a constant length by means of the cutting mechanism, to thereby produce a comb-like capacitor element member comprising the guide member and a plurality of rectangular metal foil pieces bonded to the guide member.

* * * * *